US009956969B2

(12) United States Patent
Beron-Rawdon et al.

(10) Patent No.: US 9,956,969 B2
(45) Date of Patent: May 1, 2018

(54) BRAKE DEVICE

(71) Applicant: The Boeing Company, Chicago, IL (US)

(72) Inventors: Deborah A. Beron-Rawdon, San Pedro, CA (US); Robert J. Atmur, Whittier, CA (US); Douglas C. Cameron, Jr., Ladera Ranch, CA (US); William P. Sargent, Fullerton, CA (US)

(73) Assignee: THE BOEING COMPANY, Chicago, IL (US)

( * ) Notice: Subject to any disclaimer, the term of this patent is extended or adjusted under 35 U.S.C. 154(b) by 111 days.

(21) Appl. No.: 14/701,034

(22) Filed: Apr. 30, 2015

(65) Prior Publication Data
US 2016/0318529 A1 Nov. 3, 2016

(51) Int. Cl.
| B60L 7/00 | (2006.01) |
| B61H 7/08 | (2006.01) |
| B61H 13/36 | (2006.01) |
| B60T 13/74 | (2006.01) |
| F16D 63/00 | (2006.01) |

(52) U.S. Cl.
CPC ............ B61H 7/08 (2013.01); B60T 13/748 (2013.01); B61H 13/36 (2013.01); F16D 63/002 (2013.01); F16D 63/008 (2013.01)

(58) Field of Classification Search
CPC .......... B61H 13/00; B61H 7/08; B61H 13/36; B60T 13/748; F16D 63/002; F16D 63/008; H02K 21/44; H02K 41/033; H02K 21/02; H02K 41/03

USPC ............ 188/161, 158, 157, 107, 33, 35, 41; 310/12.05, 12.09, 12.13, 68 B; 318/135
See application file for complete search history.

(56) References Cited

U.S. PATENT DOCUMENTS

| 3,641,939 | A | | 2/1972 | Remy | |
| 4,171,493 | A | | 10/1979 | Brimer et al. | |
| 4,370,577 | A | * | 1/1983 | Wakabayashi | H02K 41/03 310/12.13 |
| 4,504,750 | A | * | 3/1985 | Onodera | H02K 41/033 310/12.05 |
| 4,860,183 | A | * | 8/1989 | Maeda | G11B 5/5521 318/135 |
| 5,357,587 | A | * | 10/1994 | Grodinsky | H04R 1/403 381/414 |
| 7,617,779 | B2 | | 11/2009 | Studer | |
| 7,963,228 | B2 | | 6/2011 | Studer | |
| 8,035,323 | B2 | | 10/2011 | Cruise et al. | |

(Continued)

OTHER PUBLICATIONS

Magnetic Transport Systems, "Zero Emissions Port Container Moving System: Linear Rail Conversion", Project Description, Accessed Apr. 8, 2015, 3 pages.

(Continued)

*Primary Examiner* — Pamela Rodriguez
(74) *Attorney, Agent, or Firm* — Toler Law Group, PC

(57) ABSTRACT

An apparatus includes a housing structure and a magnetic assembly. The magnetic assembly is configured to slide within the housing structure in a first direction associated with a direction of travel of the housing structure and in a second direction that is opposite of the first direction. The magnetic assembly includes a first pole plate having a first polarity and a second pole plate having a second polarity that is opposite of the first polarity.

20 Claims, 9 Drawing Sheets

(56) References Cited

U.S. PATENT DOCUMENTS

| | | |
|---|---|---|
| 2008/0303355 A1* | 12/2008 | Fiske ................... B61C 9/46 |
| | | 310/12.09 |
| 2009/0302693 A1 | 12/2009 | Kim |
| 2010/0097014 A1 | 4/2010 | Cruise et al. |
| 2010/0231058 A1 | 9/2010 | Hoppe |
| 2011/0109173 A1 | 5/2011 | Sugita et al. |
| 2011/0187242 A1* | 8/2011 | Takeuchi ............... H02K 21/02 |
| | | 310/68 B |
| 2012/0194006 A1 | 8/2012 | Lamouree et al. |
| 2012/0200177 A1 | 8/2012 | Atkinson et al. |
| 2012/0205992 A1 | 8/2012 | Villaret |
| 2013/0181547 A1 | 7/2013 | Nishifukumoto et al. |
| 2014/0183981 A1 | 7/2014 | Atmur |
| 2014/0232209 A1 | 8/2014 | Sugita et al. |

OTHER PUBLICATIONS

Vincze, et al., "Electric Vehicles: Linear Induction Motor Driven Vehicles (LIM)", Budapest University of Technology and Economics Department of Electric Power Engineering, accessed Apr. 7, 2015, 2 pages.

* cited by examiner

BRAKE DEVICE

FIELD OF THE DISCLOSURE

The present disclosure relates to a brake device.

BACKGROUND

Induction motors are used in transportation system to move vehicles, such as railcars. For example, a linear induction motor may provide power to a railcar and cause the railcar to travel along a set of tracks. In the event of a loss of power, one or more systems of the railcar may become disabled, such as a braking system. When a loss of power occurs, the railcar may continue to travel along the tracks until the railcar eventually slows to a stop.

SUMMARY

In a particular implementation, an apparatus includes a housing structure and a magnetic assembly. The magnetic assembly is configured to slide within the housing structure in a first direction associated with a direction of travel of the housing structure and in a second direction that is opposite of the first direction. The magnetic assembly includes a first pole plate having a first polarity and a second pole plate having a second polarity that is opposite of the first polarity.

In another particular implementation, a method includes, at a brake device including a housing structure and a magnetic assembly coupled to the housing structure, the magnetic assembly configured to move relative to the housing structure in a first direction and in a second direction within the housing structure, performing moving the housing structure in the first direction that is the same as a direction of travel of the brake device. The method further includes applying, by the magnetic assembly to the housing structure, a first force that is applied in an opposite direction of the direction of travel. The method also includes moving the magnetic assembly in the first direction responsive to a second force applied by the housing in the direction of travel.

In another particular implementation, a system that includes a primary of an induction motor and a transportation vehicle. The transportation vehicle includes a secondary of the induction motor and a brake device. The secondary configured to cause movement of the transportation vehicle in a direction of travel responsive to the primary of the inductor motor being energized. The brake device configured to apply a braking force to the transportation vehicle responsive to the primary of the inductor motor being de-energized.

The features, functions, and advantages that have been described can be achieved independently in various embodiments or may be combined in yet other embodiments, further details of which are disclosed with reference to the following description and drawings.

DETAILED DESCRIPTION

Figure 1:
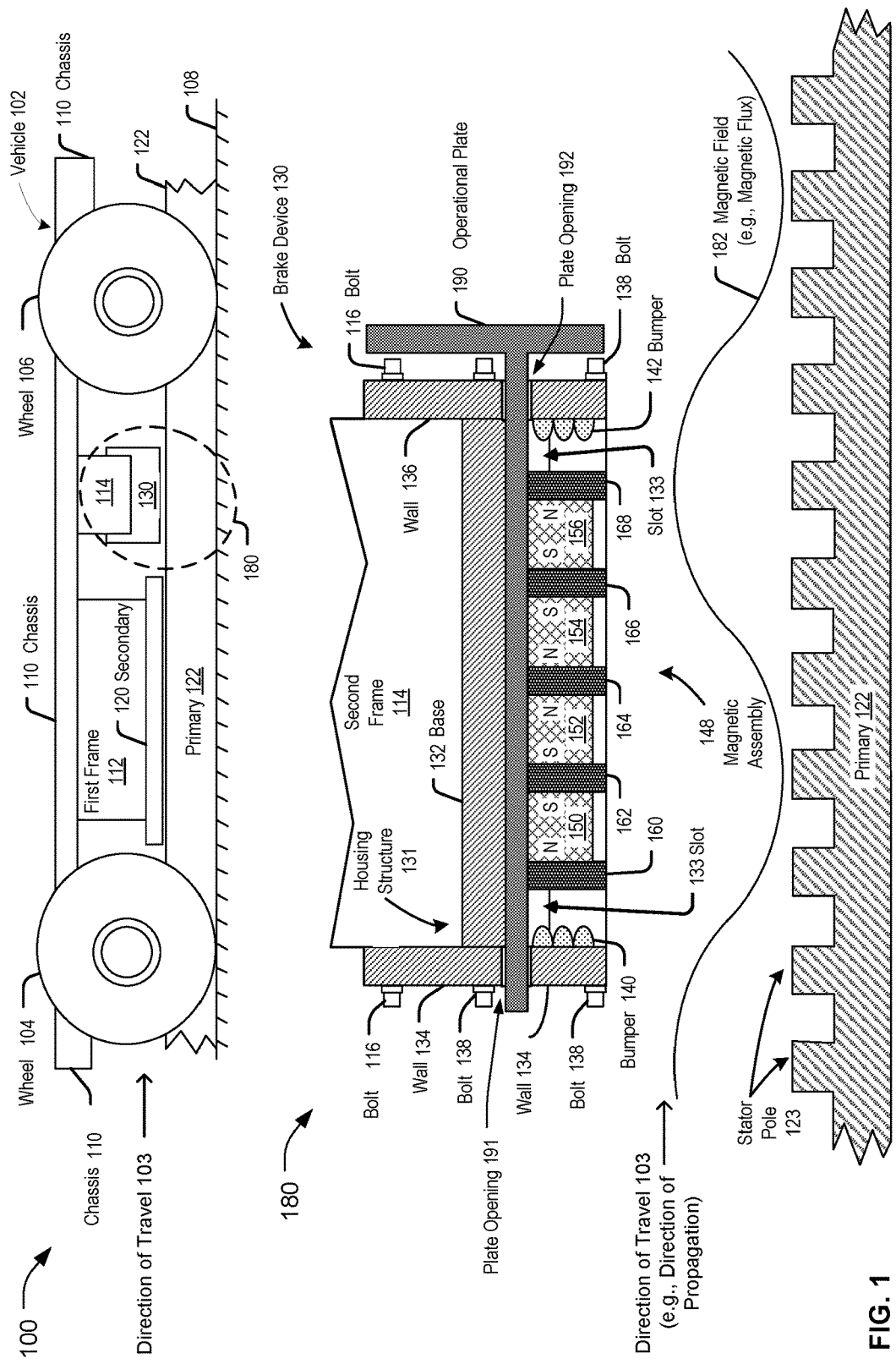
FIG. 1 is a schematic of a vehicle that includes a brake module.

Particular embodiments of the present disclosure are described below with reference to the drawings. In the description, common features are designated by common reference numbers throughout the drawings.

Aspects disclosed herein include a brake device, such as a passive magnetic brake module. The brake device may be coupled to a vehicle that moves using an induction motor, such as a linear induction motor. In the event of a power loss at the induction motor (e.g., no power is provided to the vehicle via the induction motor), the brake device may apply a braking force that is opposed to a direction of travel of the vehicle. Energy of the vehicle may be attenuated by the brake device, which may increase a rate at which the vehicle is slowed and stopped.

The brake device may include a non-magnetic housing structure having a magnetic assembly disposed therein. The magnetic assembly may be configured to slide forwards (e.g., in the direction of travel of the vehicle) and backwards (e.g., in an opposite direction of the direction of travel of the vehicle) within the non-magnetic housing structure. The magnetic assembly may include multiple pole plates and one or more magnets. A magnet may be positioned between two pole plates and each pole plate may have a corresponding polarity.

In the event of a power loss experience by the induction motor, interaction of magnetic fields of the pole plates and stator poles of the primary of the induction motor may cause the pole plates to attempt to align with the stator poles of the primary of the induction motor, such that the magnetic assembly including the pole plates slides relative to the non-magnetic housing structure towards a position in which the pole plates align with a number of stator poles (e.g., a set of stator poles) of the primary of the linear induction motor. If the vehicle is moving (e.g., in a direction of travel) when the power loss occurs, the non-magnetic housing structure coupled to the vehicle also moves in the direction of travel while the magnetic assembly and pole plates remain relatively fixed with respect to their alignment with the set of stator poles of the primary of the induction motor. A portion of the non-magnetic housing structure may come into contact with the magnetic structure and apply a force in the direction of travel. When the magnetic assembly is contacted by the non-magnetic housing structure, the magnetic assembly may apply a braking or reluctance force to the non-magnetic housing structure that is opposite to the direction of travel. The reluctance force may operate to slow a velocity of non-magnetic housing structure (e.g., the vehicle) in the direction of travel, to thereby cause deceleration of the vehicle.

If the force applied by the non-magnetic housing structure in the direction of travel is less than the reluctance force, the non-magnetic housing structure may come to a stop. However, if the force applied by the non-magnetic housing structure in the direction of travel is greater than the braking or reluctance force, the non-magnetic housing structure may advance the magnetic assembly in the direction of travel and cause the pole plates to move out of alignment with the set of stator poles of the primary, to interrupt the braking or reluctance force being applied to slow the vehicle. With the interruption of force applied by the magnetic assembly to the non-magnetic housing structure (e.g., the vehicle), the force applied by the non-magnetic housing may cause the magnetic assembly to move away from contact with the non-magnetic housing structure and slide relative to the non-magnetic housing structure in the direction of travel. For example, the magnetic assembly may jump ahead of the non-magnetic housing structure in the direction of travel and may attempt to align with a different set of stator poles positioned at a different location of the primary. A travel length or distance that the magnetic assembly may slide in the non-magnetic housing structure may be at least greater than the spacing or distance between two adjacent poles. Because the travel length or distance that the magnetic assembly may slide in the non-magnetic housing structure is at least greater than the spacing or distance between the poles, the magnetic assembly does not slide into contact with, or impart a force in the direction of travel, against an opposite portion of the non-magnetic housing structure. Instead, the magnetic assembly and pole plates slide relative to the non-magnetic housing structure in the direction of travel towards the next set or number of stator poles of the primary, such that the magnetic assembly and pole plates come into relatively fixed alignment with a different set of stator poles before the magnetic assembly can contact or impact the non-magnetic housing structure in the direction of travel. With the magnetic assembly again being relatively fixed in alignment with a different set of stator poles, the non-magnetic housing structure may again contact the magnetic assembly and apply a force on the magnetic assembly in the direction of travel. The magnetic assembly may again apply to the non-magnetic housing structure a braking or reluctance force that is opposite to the direction of travel. In a successive manner, the magnetic assembly may apply a braking or reluctance force multiple times to reduce the velocity of the housing structure (e.g. vehicle) in the direction of travel.

Each time the non-magnetic housing structure advances the magnetic assembly in the direction of travel, kinetic energy of the vehicle may be dissipated. The non-magnetic housing structure may contact and advance the magnetic assembly multiple times until movement of the vehicle in the direction of travel is stopped. Aspects disclosed herein enable the brake device to increase a rate at which the vehicle is slowed and stopped in the event of a power loss.

Referring to FIG. 1, a block diagram illustrating a particular example of a transportation system 100 is shown. The transportation system 100 may include a vehicle 102 that is moved by an induction motor, such as a linear induction motor. The induction motor may include a primary 122 and a secondary 120. The induction motor may be configured to cause the vehicle 102 to move in a direction of travel 103 (or in a direction that is opposite of the direction of travel 103).

The vehicle 102 may include a chassis 110 and wheels 104, 106. The wheels 104, 106 may be positioned on a surface 108 (e.g., the ground, a set of rails, etc.). For example, the vehicle 102 may include a railcar that is positioned on a set of rails, as an illustrative, non-limiting example. In some implementations, the vehicle 102 may be configured to levitate above the surface 108 (e.g., a set of rails or a track system). Although the vehicle 102 may be described herein as a railcar, in other implementations, the vehicle 102 may include a transportation vehicle and/or other transportation device, such as an automobile, a boat, a plane, etc., as illustrative, non-limiting examples.

The vehicle 102 may include a first frame 112 and a second frame 114 that are coupled to the chassis 110. The secondary 120 (e.g., a reaction plate) of the induction motor may be mounted to the first frame 112 and a brake device 130 (e.g., a brake module) may be mounted to the second frame 114. The vehicle 102 may also include a second brake device (not shown) that is configured to brake (e.g., stop) the vehicle, as described further herein.

A cross-sectional view of the brake device 130 is depicted at 180. The brake device 130 may be mounted to the vehicle 102 (e.g., the second frame 114) using one or more fasteners or joint assembly processes (e.g., welding or adhesives). For example, one or more bolts 116 may secure the brake device 130 to the second frame 114. The brake device 130 may be secured to the second frame 114 such that the brake device 130 is positioned above the primary 122 of the induction motor. In some implementations, the brake device 130 may be configured to be mounted directly to the chassis 110.

The brake device 130 may include a housing structure 131 and a magnetic assembly 148. The housing structure 131 may include a base 132, a first wall 134, and a second wall 136. Each of the first wall 134 and the second wall 136 may be coupled to the base 132 using one or more fasteners or joint assembly processes (e.g., welding or adhesives). For example, one or more bolts 138 may couple the first wall 134 and the second wall 136 to the base 132. Each of the base 132, the first wall 134, and the second wall 136 may include a non-magnetic material, such as aluminum. The housing structure 131 may also include a first bumper 140 and a second bumper 142. Each of the first bumper 140 and the second bumper 142 may include a spring, a shock absorber, and/or an elastic material (e.g., rubber), as illustrative, non-limiting examples. The first bumper 140 may be coupled to the first wall 134 and the second bumper 142 may be coupled to the second wall 136. Although the housing structure 131 is described as having three distinct components (e.g., the base 132, the first wall 134, and the second wall 136), in other implementations, the housing structure 131 may include more than three components or fewer than three components. For example, the housing structure 131 may be formed (e.g., manufactured) as a single piece of aluminum, as an illustrative, non-limiting example.

The magnetic assembly 148 may include magnets 150-156 and pole plates 160-168. For example, the magnets 150-156 may include a first magnet 150, a second magnet 152, a third magnet 154, and a fourth magnet 156. Each of the magnets 150-156 may be a permanent magnet, such as a high energy magnet. Although the magnetic assembly 148 is described as including four magnets, in other implementations, the magnetic assembly 1448 may include more than or fewer than four magnets. The pole plates 160-168 may include a first pole plate 160, a second pole plate 162, a third pole plate 164, a fourth pole plate 166, and a fifth pole plate 168. Each of the pole plates 160-168 may include a magnetic material, such as steel. Each of the pole plates 160-168 may be spaced apart from an adjacent pole plate by approximately the same distance (e.g., at the same predetermined spacing). For example, the first pole plate 160 may be spaced apart from the second pole plate 162 at a distance (the same distance between each of the plurality of pole plates) that is approximately the same as the spacing between a pair of adjacent (e.g., consecutive) stator poles of the primary 122, or an integer multiple of that spacing, to enable the first pole plate 160 and the second pole plate 162 (and other pole plates of the magnetic assembly 148) to generally align with a set of stator poles 123 of the primary 122. The spacing between the pole plates 160-168 (e.g., between the first pole plate 160 and the second pole plate 162) may enable the pole plates 160-168 to align with a set of stator poles of the primary 122 having stators that are spaced apart at approximate the same predetermined spacing between the first pole plate 160 and the second pole plate 162. In a particular implementation of the brake device 130, each of the pole plates 160-168 is preferably spaced apart from an adjacent pole plate by a distance of about N inches (where N is a positive number), which may correspond to an associated spacing between respective stator plates of a primary 122. Similarly, each of the magnets 150-156 has a width that is based on (e.g., dependent on) the distance between the pole plates 160-168. Additionally, each of the magnets 150-156 has an effective length that enables the magnetic assembly 148 to generate a magnetic field of sufficient strength to produce an attraction force for holding the pole plates 160-168 in alignment with the stator poles of the primary 122 that may cause a braking or reluctance force applied to the housing structure 131 (e.g., the vehicle 102) in a direction opposite to the direction of travel. In a particular illustrative example of the brake device 130, each of the magnets 150-156 preferably has a length of at least N inches. Although the pole plates 160-168 are described as including five pole plates, in other implementations, the magnetic assembly 148 may include more than or fewer than five pole plates.

The magnets 150-156 may be positioned between the pole plates 160-168. For example, each of the magnets 150-156 may be positioned between two pole plates. To illustrate, the first magnet 150 may be positioned between the first pole plate 160 and the second pole plate 162 such that a first pole (e.g., a north (N) pole) of the first magnet 150 is adjacent to the first pole plate 160 and a second pole (e.g., a south (S) pole) of the first magnet 150 is adjacent to the second pole plate 162. The second magnet 152 may be positioned between the second pole plate 162 and the third pole plate 164 such that the first pole (e.g., the N pole) of the second magnet 152 is adjacent to the third pole plate 164 and the second pole (e.g., the S pole) of the second magnet 152 is adjacent to the second pole plate 162. The third magnet 154 may be positioned between the third pole plate 164 and the fourth pole plate 166 such that the first pole (e.g., the N pole) of the third magnet 154 is adjacent to the third pole plate 164 and the second pole (e.g., the S pole) of the third magnet 154 is adjacent to the fourth pole plate 166. The fourth magnet 156 may be positioned between the fourth pole plate 166 and the fifth pole plate 168 such that the first pole (e.g., the N pole) of the fourth magnet 156 is adjacent to the fifth pole plate 168 and the second pole (e.g., the S pole) of the fourth magnet 156 is adjacent to the fourth pole plate 166.

Each of the pole plates 160-168 may focus magnetic flux(es) from an adjacent magnet or adjacent magnets and may have a corresponding polarity. For example, each of the pole plates 160, 164, 168 may have a first polarity (e.g., the N pole) and each of the pole plates 162, 166 may have a second polarity (e.g., the S pole). To illustrate, the first pole plate 160 (having the first polarity) may focus magnetic flux (associated with the first polarity) of the first magnet 150. The second pole plate 162 (associated with the second polarity) may focus magnetic flux (associated with the second polarity) of the first magnet 150 and the second magnet 152. The third pole plate 164 (associated with the first polarity) may focus magnetic flux (associated with the first polarity) of the second magnet 152 and the third magnet 154. The fourth pole plate 166 (associated with the second polarity) may focus magnetic flux (associated with the second polarity) of the third magnet 154 and the fourth magnet 156. The fifth pole plate 168 (associated with the first polarity) may focus magnetic flux (associated with the first polarity) of the fourth magnet 156.

The magnetic assembly 148 may be positioned within and/or supported by the housing structure 131. For example, the base 132 of the housing structure 131 may include a slot 133 that is configured to receive a portion of the magnetic assembly 148, such as a portion of one or more of the pole plates 160-168), as described further with reference to FIG. 3. Additionally, the slot 133 may be configured to guide movement of the magnetic assembly 148 within the housing structure 131. As another example, the housing structure 131 may include a bottom wall (not shown) that is coupled to the base 132, the first wall 134, and/or to the second wall 136. The magnetic assembly 148 may be supported by the bottom wall that is positioned between the magnetic assembly 148 and the primary 122. The bottom wall may be non-magnetic. For example, the bottom wall may include aluminum, as an illustrative, non-limiting example. In some implementations, the portion of the magnetic assembly 148 may be positioned in the slot 133 (to support the magnetic assembly 148) and the housing structure 131 may include a bottom wall to restrict access to the magnetic assembly 148.

The magnetic assembly 148 may be configured to move (e.g., slide) within the housing structure 131. For example, the magnetic assembly 148 may be configured to slide longitudinally in the direction of travel 103 or opposite of the direction of travel 103, as described further with reference to FIG. 2. To illustrate, the magnetic assembly 148 may be configured to move (e.g., slide) from a first position (corresponding to the first bumper 140) of the housing structure 131 to a second position (corresponding to the second bumper 142) of the housing structure 131. Additionally or alternatively, the magnetic assembly 148 may be configured to move (e.g., slide) from the second position (corresponding to the second bumper 142) of the housing structure 131 to the first position (corresponding to the first bumper 140) of the housing structure 131. A travel length or predetermined distance that the magnetic assembly 148 can slide within the housing structure 131 is at least greater than the spacing or distance between the individual stator poles 123, such that the magnetic assembly 148 may slide away from the first bumper 140 the predetermined distance towards relatively fixed alignment with another set of stator poles before the magnetic assembly 148 can contact the second bumper 142. For example, the housing structure 131 (e.g., the base 132) may be longer than the magnetic assembly 148 (by at least the predetermined distance), such that the magnetic assembly 148 slides at least the predetermined distance within the housing structure 131. Additionally or alternatively, the distance that the magnetic assembly 148 may slide within the housing structure 131 is at least greater than a predetermined spacing between the first pole plate 160 and the second pole plate 162.

The housing structure 131 may be configured to receive one or more plates, such as a safety plate (not shown) or an operational plate 190. For example, the housing structure 131 may include one or more plate openings, such as a first plate opening 191 and a second plate opening 192. To illustrate, the first plate opening 191 may be included in the first wall 134 and the second plate opening 192 may be included in the second wall 136.

The safety plate may include a magnetic material, such as steel, as an illustrative, non-limiting example. When the safety plate is inserted into the one or more plate openings 191, 192, the brake device 130 may be rendered inoperable. For example, when the safety plate is inserted, the safety plate captures magnet fields produced by the magnetic assembly 148 and relatively little flux is provided outside of the brake device 130. Stated differently, the safety plate neutralizes the magnetic fields produced by the magnets 150-156 and, thus, there is not a significant field produced by the magnets 150-158 outside of the housing structure 131. To illustrate, the magnetic assembly 148 may remain in the same position relative to the safety plate while the safety plate is inserted in the brake device 130. Accordingly, the safety plate inhibits movement of the magnetic assembly 148, and enables the brake device 130 to be handled, moved, installed, repaired, etc., without having the magnetic assembly 148 being able to move freely within the housing structure 131 or apply a reluctance force to the housing structure 131.

When the safety plate is removed, the brake device 130 may be operational and the magnetic assembly 148 may be free to move (e.g., slide) within the housing structure 131. For example, the magnetic fields associated with the magnetic assembly 148 may extend outside of the brake device 130 (e.g., the housing structure 131) and may cause the magnetic assembly to shift (e.g., slide) within the housing structure 131. The operational plate 190 may be inserted into one or more of plate openings 191, 192 when the brake device 130 is operational to prevent objects from being inserted into the one or more plate openings 191, 192. The operational plate 190 may include a non-magnetic material, such as aluminum or plastic, as illustrative, non-limiting examples. In some implementations, the operational plate 190 may include a warning, such as a sign, that indicates that the brake device 130 is operational and/or that magnetic fields (associated with the magnetic assembly 148) are present.

The induction motor may include the primary 122 and the secondary 120. The primary 122 of the induction motor may include a set of coils and is sometimes called a stator. The coils of the primary 122 may include or correspond to stator poles 123 (or stator teeth). The secondary 120 may be referred to as a reaction plate. The induction motor (e.g., the primary 122) may extend in a longitudinal direction that is along the direction of travel 103.

The set of coils of the primary 122 may include multiple coils arranged to generate a magnetic flux (e.g., a control flux), such as a representative magnetic field 182. For example, the multiple coils may be arranged along the longitudinal direction and each coil may be configured (e.g., wired) to receive current of a corresponding phase of multi-phase current. The multi-phase current may include two or more current phases, such as two-phase alternating current, three-phase alternating current, etc., as illustrative, non-limiting examples.

To illustrate, the multi-phase current may be applied to the coils of the primary 122 to generate a moving magnetic field (e.g., the magnetic field 182). The magnetic field 182 (e.g., magnetic flux) may be orientated along the same longitudinal direction that the primary extends. It should be understood that the magnetic field 182 depicted in FIG. 1 is for illustrative purposes and that the magnetic field 182 produced by the primary 122 may have a different magnitude and/or a different frequency than illustrated. The magnetic field 182 may propagate (e.g., move) in the direction of travel 103. The moving magnetic field 182 of the coils of the primary 122 may induce current flow in the secondary 120, which generates an induced magnetic field. The induced magnetic field may generate a force in the secondary 120 that is in the direction of travel 103. Interaction of the moving magnetic field 182 of the primary 122 and the induced magnetic field of the secondary 120 may create a force that moves (e.g., propels) the secondary 120. Moving the secondary 120 may cause the vehicle 102 to move in the same direction. As illustrated in FIG. 1, the induced magnetic field of the secondary 120 moves the secondary 120 (e.g., the vehicle 102) in the direction of travel 103.

When the induction motor is off and the vehicle 102 is in a stopped position (e.g., the vehicle 102 is not moving) above the primary 122, the magnetic assembly 148 may interact with the primary 122 of the induction motor. For example, each of the pole plates 160-168 may interact with a different stator pole 123 of the primary 122. To illustrate, the pole plates 160-168 may center (e.g., align) above a set of stator poles 123 due to magnetic fields of the pole plates 160-168 being attracted to the set of stator poles 123.

When the induction motor is active (e.g., energized), the vehicle 102 may be maintained in the stopped position using a second brake device (not shown). The second brake device, such as an active braking device, may be operable using power received from the secondary 120. The second brake device may apply a braking force to the vehicle 102. For example, the second brake device may physically couple to the wheels 104, 106 to apply a frictional braking force. As another example, the second brake device may prevent a magnetic field from being induced in the secondary 120. For example, the second brake device may ground the secondary 120 such that a magnetic field may not be induced in the secondary 120.

When the induction motor is on and the vehicle 102 is moving (e.g., the second brake device is not braking the vehicle 102), the primary 122 may generate the magnetic field 182 that induces a magnetic field in the secondary 120. The induced magnetic field may generate a force in the direction of travel 103 that causes the vehicle 102 to move in the direction of travel (e.g., if the second brake device is not active and does not apply a braking force to the vehicle 102). Additionally, when the induction motor is active (e.g., the primary 122 is energized), the magnetic field 182 may disable the brake device 130 by overcoming the magnetic flux generated by the magnets 150-156. For example, the magnetic assembly 148 (e.g., the magnets 150-156 and/or the pole plates 160-168) may try to align with the traveling magnetic field 182. Accordingly, the moving magnetic field 182 may push the magnetic assembly in the direction of travel 103. To illustrate, the magnetic field 182 may cause the magnetic assembly 148 to slide within the housing structure 131 in the direction of travel 103. In some implementations, the magnetic field 182 may cause the magnetic assembly 148 to slide into contact with the second bumper 142. When the magnetic assembly 148 is in contact with the second bumper 142 and is being pushed by the magnetic field 182, the magnetic assembly 148 may apply a force to the second bumper 142 (e.g., the vehicle 102) in the direction of travel 103. The force applied by the magnetic assembly 148 in the direction of travel 103 may be in addition to a force applied by the secondary 120 (e.g., the reaction plate) to the vehicle 102 that causes the vehicle 102 to move in the direction of travel 103.

If power is lost while (e.g., the primary 122 becomes de-energized), the magnetic assembly 148 may align itself with the stator poles 123. For example, the magnetic assembly 148 may slide within the housing structure 131 such that the pole plates 160-168 may center (e.g., align) above a set of stator poles 123. If the vehicle 102 is moving in the direction of travel 103 when power is lost, the magnetic assembly 148 may interact with the housing structure 131 to provide a braking force (e.g., a reluctance force) to the vehicle 102, as described further with reference to FIG. 2.

Figure 2:
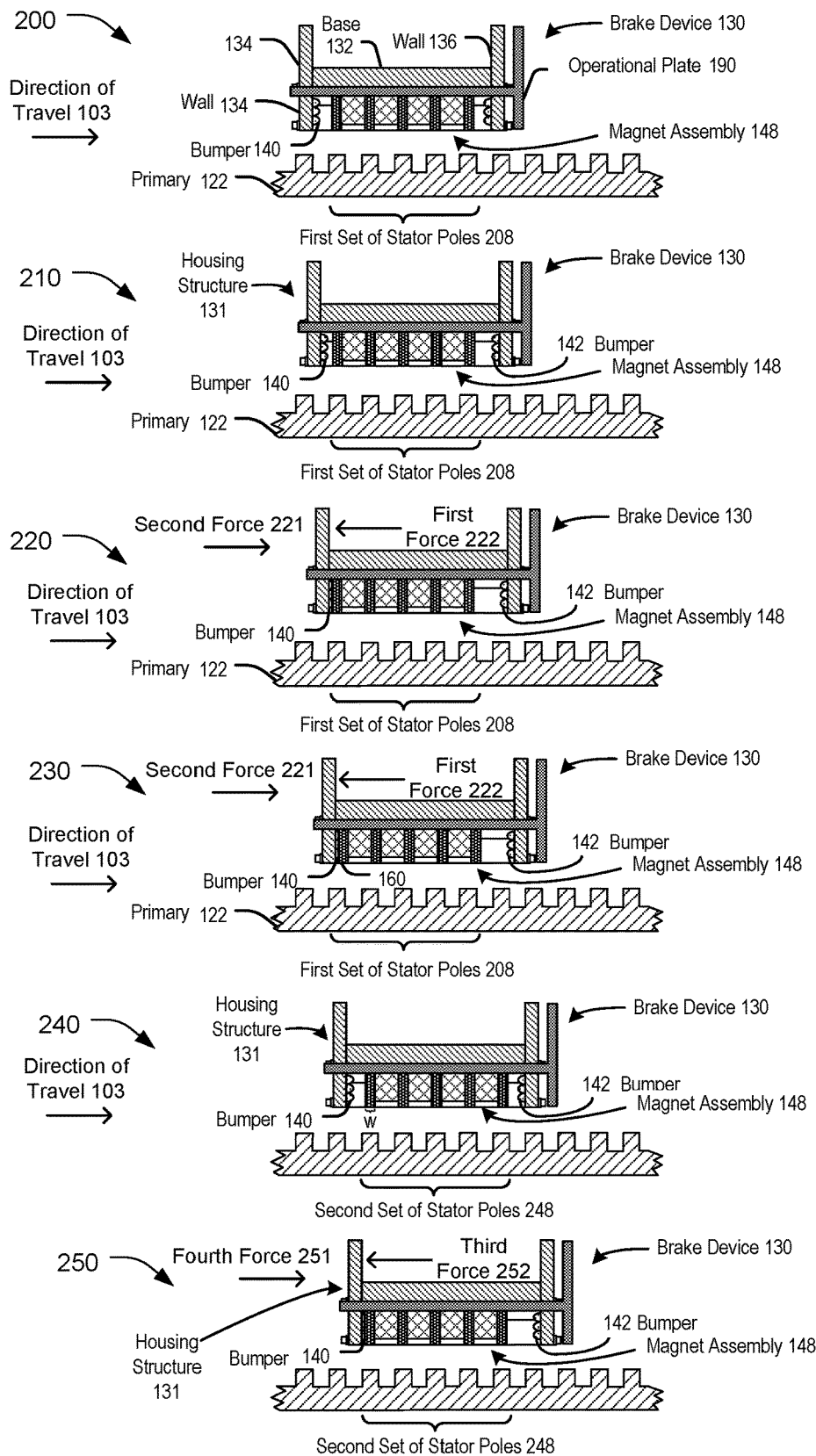
FIG. 2 includes diagrams to illustrate operation of the brake module of FIG. 1.

Referring to FIG. 2, diagrams that illustrate operation of the brake device 130 after a power loss are depicted. The brake device 130 is illustrated at a first stage, at 200. Prior to the first stage, the brake device 130 (e.g., the vehicle 102) was traveling in the direction of travel 103 responsive to the magnetic field 182 generated by the primary 122. The first stage depicts the brake device 130 after the primary 122 has lost power. In response to the loss of power, the magnetic assembly 148 may align with the primary 122, such that the pole plates 160-168 may align with a first set of stator poles 208 of the primary 122. Accordingly, the magnetic assembly 148 including the pole plates 160-168 may slide relative to the housing structure 131 towards a position in which the pole plates 160-168 align with a number of stator poles 123 (e.g., the first set of stator poles 208) of the primary 122.

The brake device 130 is illustrated at a second stage after the power loss, at 210. At the second stage, the magnetic assembly 148 may be aligned with the first set of stator poles 208, where the magnetic assembly 148 produces an attraction force for holding the pole plates 160-168 in alignment with the set of stator poles 208 such that the magnetic assembly 148 remains generally fixed with respect to the first set of stator poles 208. Between the first stage (at 200) and the second stage (at 210), the housing structure 131 may have continued to advance in the direction of travel 103 based on the kinetic energy of the housing structure 131 (e.g., the forward motion of the vehicle 102 in the direction of travel 103). For example, the first bumper 140 may be closer to the magnetic assembly 148 at the second stage (at 210) than at the first stage (at 200).

The brake device 130 is illustrated at a third stage after the power loss, at 220. At the third stage, the magnetic assembly 148 may be aligned with the first set of stator poles 208, such that the magnetic assembly 148 remains generally fixed with respect to the first set of stator poles 208. Between the second stage (at 210) and the third stage (at 220), the housing structure 131 may have continued to advance in the direction of travel 103. For example, the first bumper 140 may be in contact with the magnetic assembly 148. Based on the magnetic coupling between the magnetic assembly 148 (e.g., the pole plates 160-168) and the first set of stator poles 208, the magnetic assembly 148 may apply a first force (e.g., a braking force) that opposes a second force 221 of the housing structure 131 in the direction of travel 103. For example, a first force 222 (e.g., a first reluctance force) may be generated because the magnetic fields of the pole plates 160-168 cause the pole plates 160-168 to remain in a fixed position relative to the first set of stator poles 208 until the second force 221 overcomes the first force 222. At the third stage (at 220) the second force 221 of the housing structure 131 in the direction of travel 103 may be greater than the first force 222.

The brake device 130 is illustrated at a fourth stage after the power loss, at 230. If the second force 221 of the housing structure 131 in the direction of travel 103 is greater than the first reluctance force 222, the housing structure 131 may advance the magnetic assembly 148 in the direction of travel 103 and cause the pole plates 160-168 to move out of alignment with the first set of stator poles 208, to interrupt the first reluctance force 222 being applied. At the fourth stage, the magnetic assembly 148 may be offset (in the direction of travel 103) with respect to the first set of stator poles 208. For example, between the third stage (at 220) and the fourth stage (at 230), the housing structure 131 may have applied the second force 221 in the direction of travel 103 on the magnetic assembly 148 and caused the magnetic assembly 148 to move in the direction of travel 103. To move the magnetic assembly 148 in the direction of travel 103, kinetic energy of the housing structure 131 (e.g., the vehicle 102) may be dissipated, which may reduce a speed of the housing structure 131 (e.g., the vehicle 102) in the direction of travel 103. Although the magnetic assembly 148 moves in the direction of travel 103, the magnetic assembly 148 does not contact or impart a force in the direction of travel 103 against the second bumper 142, because the travel length or distance that the magnetic assembly 148 can slide in the housing structure 131 is at least greater than the spacing or distance between the stator poles 123 (of the primary). Thus, the magnetic assembly 148 does not slide into contact with or impart a force against the second bumper 142 because the magnetic assembly 148 slides towards and comes to a stop in relatively fixed alignment with the second set of stator poles 248 before the magnetic assembly 148 can contact or impact the second bumper 142.

The brake device 130 is illustrated at a fifth stage after power loss, at 240. At the fifth stage, the magnetic assembly 148 may be aligned with a second set of stator poles 248 of the primary 122. For example, the pole plates 160-168 may be aligned with (e.g., centered on) the second set of stator poles 248. Between the fourth stage (at 230) and the fifth stage (at 240), the housing structure 131 may have pushed the magnetic assembly 148 out of alignment with the first set of stator poles 208 sufficiently that the magnetic assembly 148 has advanced (e.g., jumped) forward in the direction of travel 103 to align with the second set of stator poles 208. In some implementations, the magnetic assembly 148 may advance from the first set of stator poles 208 to the second set of stator poles 248 when a pole plate (e.g., the first pole plate 160) of the magnetic assembly 148 is offset with respect to a corresponding stator pole of the primary 122 by more than approximately a third to a half of a width (w) of the pole plate.

The brake device 130 is illustrated at a sixth stage after power loss, at 250. At the sixth stage, the housing assembly has advanced in the direction of travel 103 and the first bumper 140 is in contact with the magnetic assembly 148. For example, between the fifth stage (at 240) and the sixth stage (at 250) the housing structure 131 has advanced in the direction of travel 103 while the magnetic assembly 148 has remained relatively fixed with respect to the second set of stator poles 248. At the sixth stage, the magnetic assembly 148 may apply a third force 252 (e.g., a braking force) and the first bumper 140 (e.g., the housing structure 131) may apply a fourth force 251 in the direction of travel 103 to the magnetic assembly 148. The third force 252 (e.g., a reluctance force) may oppose the fourth force 251.

If the fourth force 251 is less than or equal to the third force 252, the housing structure 131 may no longer move in the direction of travel 103 (e.g., the vehicle 102 may be stopped). Alternatively, if the fourth force 251 is greater than the third force 252, the housing structure 131 may cause the magnetic assembly 148 to advance in the direction of travel 103. For example, if the fourth force 251 is sufficient to move the magnetic assembly 148 out of alignment with respect to the second set of stator poles 248, the magnetic assembly 148 may move (in the direction of travel 103) into alignment with another set of stator poles of the primary 122. However, if the fourth force 251 is insufficient to move the magnetic assembly 148 out of alignment with the second set of stator poles 248 (e.g., moving the magnetic assembly 148 reduces the fourth force 251 to be less than the third force 252), the housing structure 131 (e.g., the vehicle) may come to rest and may no longer advance in the direction of travel 103. Thus, in a successive manner, the magnetic assembly 148 may apply a braking or reluctance force multiple times to reduce the velocity of the housing structure 131 (e.g. the vehicle 102) in the direction of travel 103.

Each time the housing structure 131 advances the magnetic assembly 148 in the direction of travel 103, energy may be dissipated from the housing structure 131 (e.g., from the vehicle 102). For example, each time the housing structure 131 advances the magnetic assembly 148 in the direction of travel 103, a velocity of the vehicle in the direction of travel 103 may be reduced. The housing structure 131 may advance the magnetic assembly 148 multiple times until movement of the vehicle 102 in the direction of travel 103 is stopped or until power is resumed.

In some implementations, multiple brake devices may be coupled to the second frame 114, as described with reference to FIGS. 6 and 7. The multiple brake devices may increase a reluctance force that may be applied to slow the vehicle.

Thus, the brake device 130 may be used to slow the velocity of the vehicle 102 in the event of a power loss associated with the inductor motor. For example, the brake device 130 may decay the velocity of the vehicle 102 rather than trying to abruptly stop the vehicle 102. Because the brake device 130 slows the vehicle 102 without receiving a power input, the brake device 130 may be considered a passive brake device.

Figure 3:
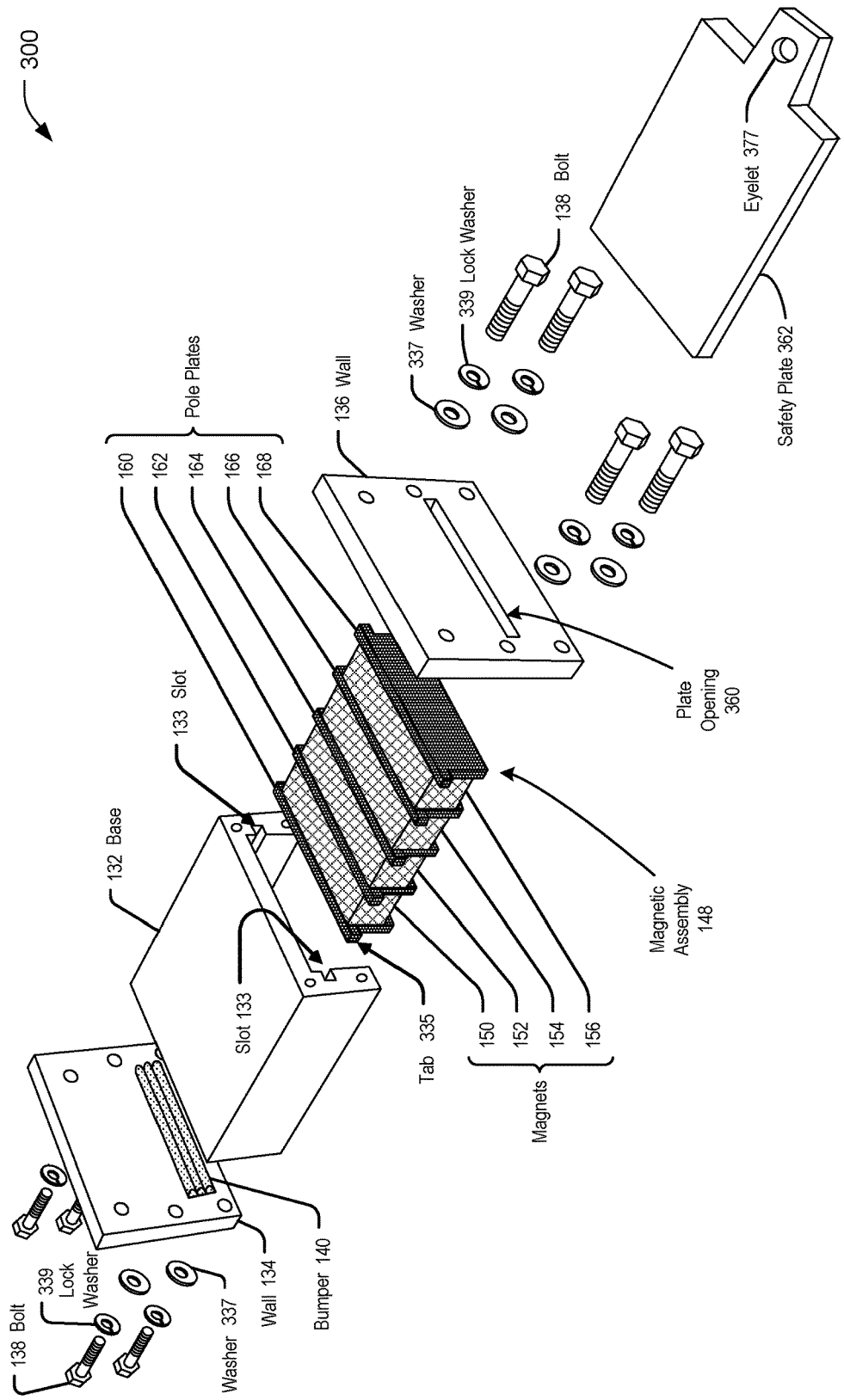
FIG. 3 is an isometric assembly drawing of an illustrative example of a brake module.

Referring to FIG. 3, an assembly drawing of the brake device 130 is depicted and generally designated 300. The first wall 134 may be coupled to the base 132 by the bolts 138, lock washers 339, and washers 337. The first bumper 140 may be coupled to the first wall 134. Although the first wall 134 is illustrated in FIG. 3 as not having a plate opening, in other implementations, the first wall 134 may include plate opening, such as the plate opening 191 of FIG. 1.

The base 132 may be configured to receive the magnetic assembly 148. For example, the base 132 may include slots into which magnetic assembly 148 may be inserted. The magnetic assembly 148 may include the pole plates 160-168 and the magnets 150-156. Each of the pole plates 160-168 may have one or more tabs 335 that are each configured to fit into the slot 133.

The second wall 136 may be coupled to the base 132 by the bolts 138, the lock washers 339, and the washers 337. For example, the second wall 136 may be coupled to the base 132 after the magnetic assembly 148 is inserted into (e.g., positioned within) the base 132. The second wall 136 may include a plate opening 360. The plate opening 360 may correspond to the plate opening 192 of FIG. 1.

A safety plate 362, such as a steel plate, may be inserted through the plate opening 360 after the second wall 136 is coupled to the base 132. Additionally or alternatively, the safety plate 362 may be removed from the brake device 130 via the plate opening 360. The safety plate 362, when inserted into the base 132 via the plate opening 360, may be configured to disable the magnetic assembly 148 from freely sliding within the base 132. In other implementations, the safety plate 362 may be magnetically coupled to the magnetic assembly 148 prior to the magnetic assembly 148 being inserted into the base 132. The magnetic assembly 148 and the safety plate 362 may be inserted into the base 132 together, after which, the second wall 136 may be coupled to the base. The safety plate 362 may include an eyelet 377 to enable the safety plate 362 to be magnetically decoupled from the magnetic assembly 148 by pulling the safety plate 362 through the plate opening 360.

Figure 4:
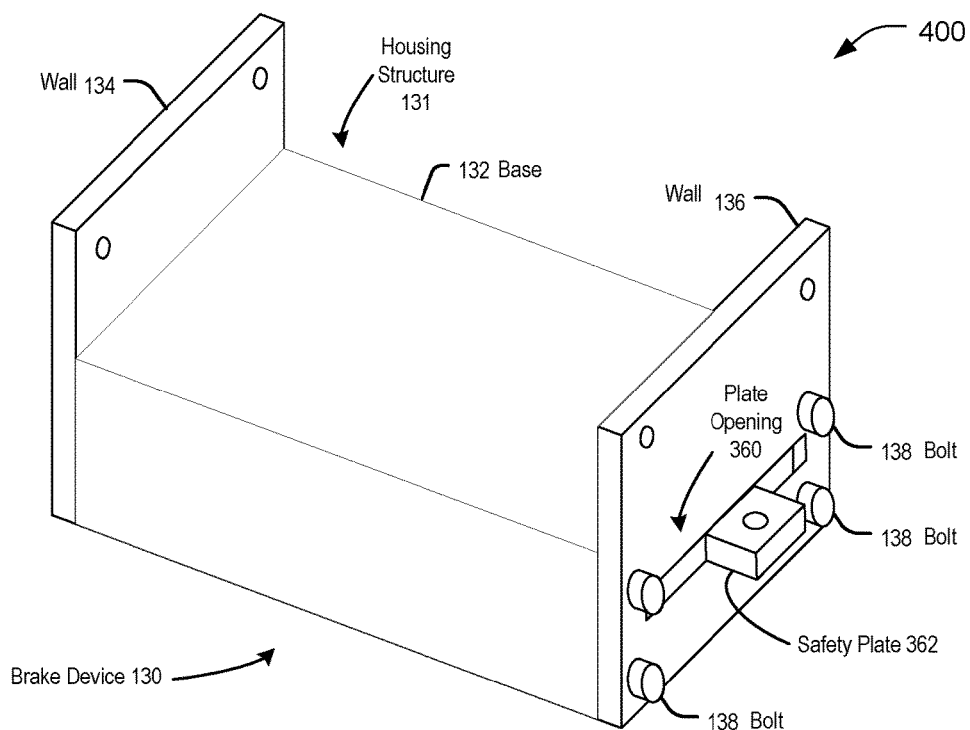
FIG. 4 is a top isometric view of an illustrative example of a brake module.

Referring to FIG. 4, a top-front isometric view of the brake device 130 is depicted and generally designated 400. The brake device 130 of FIG. 4 shows the assembled brake device 130 having the safety plate 362 inserted in the plate opening 360. For example, the safety plate 362 is positioned at least partially within the housing structure 131 and is configured to neutralize (or isolate) one or more magnetic fields associated with the magnetic assembly 148.

Figure 5:
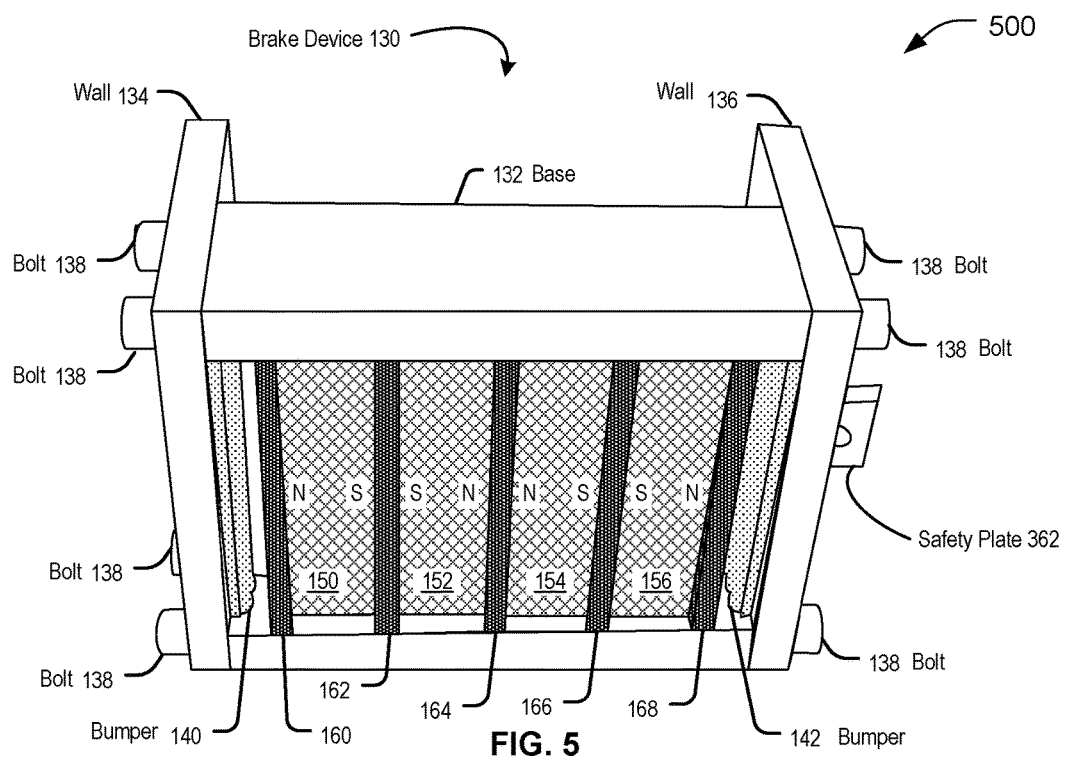
FIG. 5 is a bottom isometric view of an illustrative example of brake module.

Referring to FIG. 5, a bottom isometric view of the brake device 130 is depicted and generally designated 500. The brake device 130 of FIG. 5 shows the assembled brake device 130 including the safety plate 362.

Figure 6:
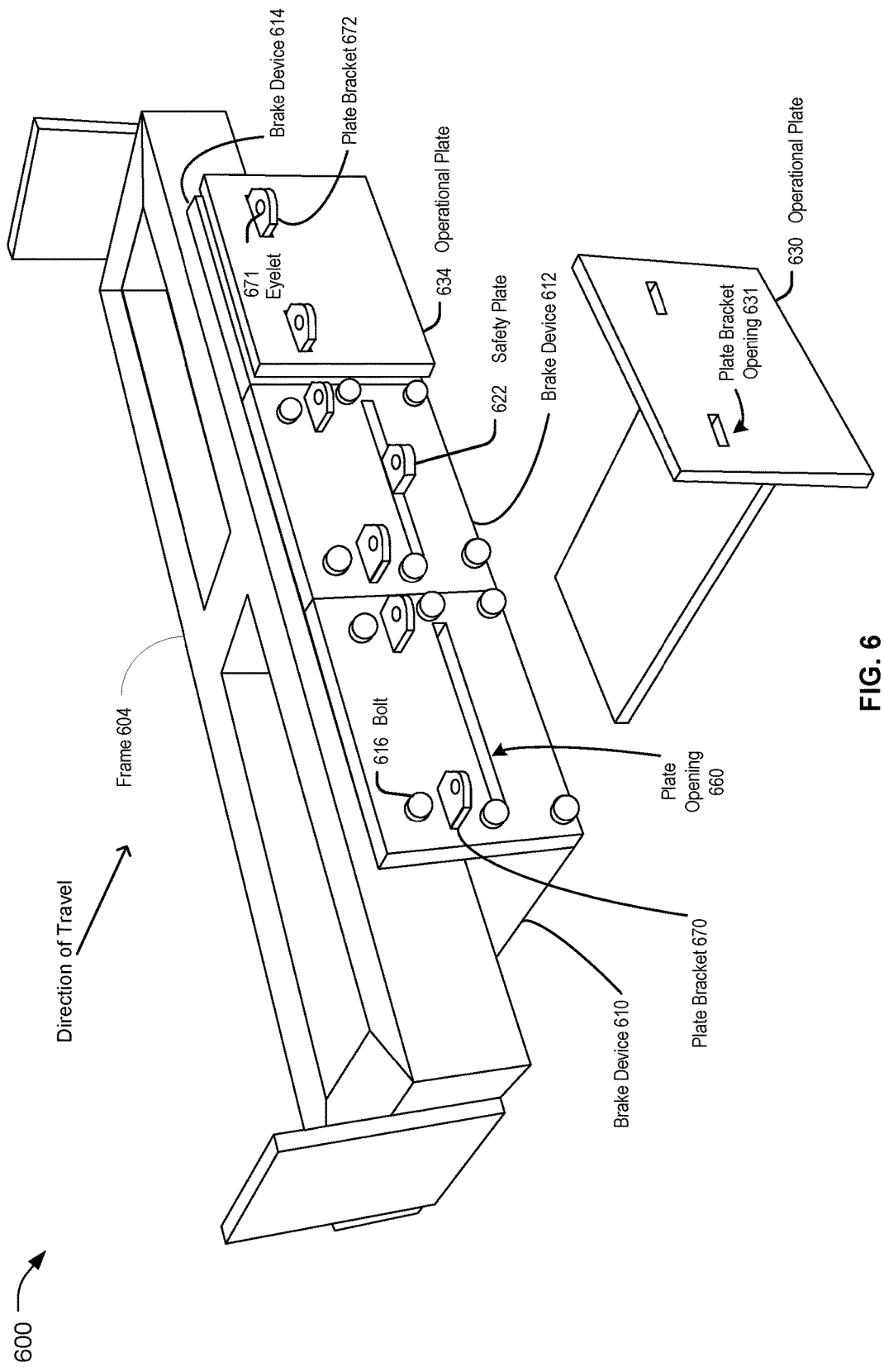
FIG. 6 is an isometric drawing of an illustrative example of brake modules mounted to a frame.

Referring to FIG. 6, an isometric view of a system that includes multiple brake devices coupled to a frame is depicted and generally designated 600. The system 600 may be coupled to a vehicle, such as the vehicle 102 of FIG. 1. When the system 600 is coupled to the vehicle, the system 600 may move along with the vehicle in a direction of travel. The direction of travel may correspond to the direction of travel 103 of FIG. 1.

The system 600 may include a frame 604 and brake devices 610-614 coupled to the frame 604. The frame 604 may correspond to the second frame 114 of FIG. 1. Each of the brake devices 610-614 may include the brake device 130 of FIG. 1. The brake devices 610-614 may include a first brake device 610, a second brake device 612, and a third brake device 614. Although three brake devices are depicted as being coupled to the frame 604, in other implementations, more than three brake devices or fewer than three brake devices may be coupled to the frame 604. Each of the brake devices 610-614 may be coupled to the frame 604 by one or more fasteners, such as a representative bolt 616. The bolt 616 may include or correspond to the bolt 116 of FIG. 1.

The second brake device 612 is depicted as having a safety plate 622 inserted into the second brake device 612. The safety plate 622 may include or correspond to the safety plate 362 of FIG. 3. The second brake device 612 including the safety plate 622 may be in a disabled state.

The first brake device 610 is depicted after a corresponding safety plate has been removed from the first brake device 610. For example, the corresponding safety plate may have been removed via the plate opening 660. The plate opening 660 may correspond to the plate opening 191, 192 of FIG. 1 or the plate opening 360 of FIG. 3. The first brake device 610 that does not include a safety plate may be in an active state (e.g., an operational state). The first brake device 610 may be configured to receive a first operational plate 630 via the plate opening 660. The first operational plate 630 may include or correspond to the operational plate 190 of FIG. 1. The first operational plate 630 may be configured to prevent one or more objects from being inserted into the plate opening 660 while the first brake device 610 is in the active state.

The third brake device 614 is depicted after a second operational plate 634 has been inserted into the third brake device 614. The second operational plate 634 may include or correspond to the operational plate 190 of FIG. 1.

In some implementations, each of the brake devices 610-614 may include one or more plate brackets. For example, the first brake device 610 may include a first plate bracket 670, and the third brake device 614 may include a second plate bracket 672. Each of the plate brackets may be configured to be inserted through an opening of an operational plate. For example, the first plate bracket 670 may be configured to be inserted through a plate bracket opening 631 of the first operational plate 630. Each of the plate brackets may include an eyelet, such as an eyelet 671 of the second plate bracket 672. When the second plate bracket 672 is inserted through a plate bracket opening of the second operational plate 634, a securing device (not shown) may be inserted through the eyelet 671 to securely couple the second operational plate 634 and the third brake device 614. For example, the securing device may include a lock, a bolt, or a lanyard, as illustrative, not limiting examples.

Figure 7:
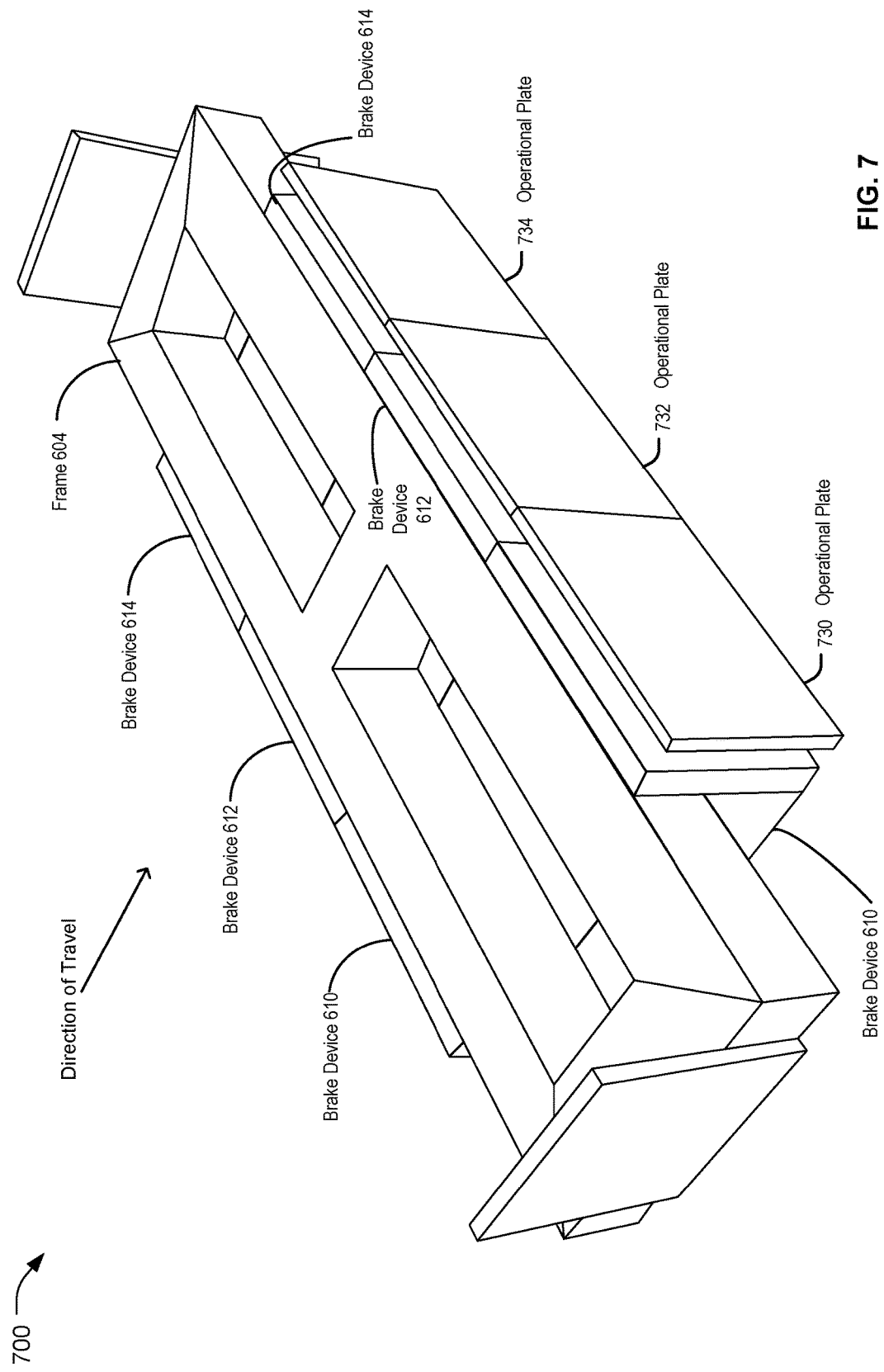
FIG. 7 is an isometric drawing of an illustrative example of brake modules mounted to a frame.

Referring to FIG. 7, an isometric view of a system that includes multiple brake devices coupled to a frame is depicted and generally designated 700. The system 700 may include or correspond to the system 600 of FIG. 6. The system 700 may be coupled to a vehicle, such as the vehicle 102 of FIG. 1. When the system 700 is coupled to the vehicle, the system 700 may move along with the vehicle in a direction of travel. The direction of travel may correspond to the direction of travel 103 of FIG. 1.

The system 700 may include a frame 604 and brake devices 610-614 coupled to the frame 604. In FIG. 7, each of the brake devices 610-614 is in an active state (e.g., an operational state) and has a corresponding operational plate inserted therein. For example, a first operational plate 730 is inserted in the first brake device, a second operational plate 732 is inserted into the second brake device 612, and a third operational plate 734 is inserted into the third brake device 614. Each of the operational plates 730-734 may include or correspond to the operational plate 190 of FIG. 1, the first operational plate 630, or the second operational plate 634 of FIG. 6. Each of the operational plates 730-734 may be coupled to a corresponding brake device by a securing device (not shown).

Figure 8:
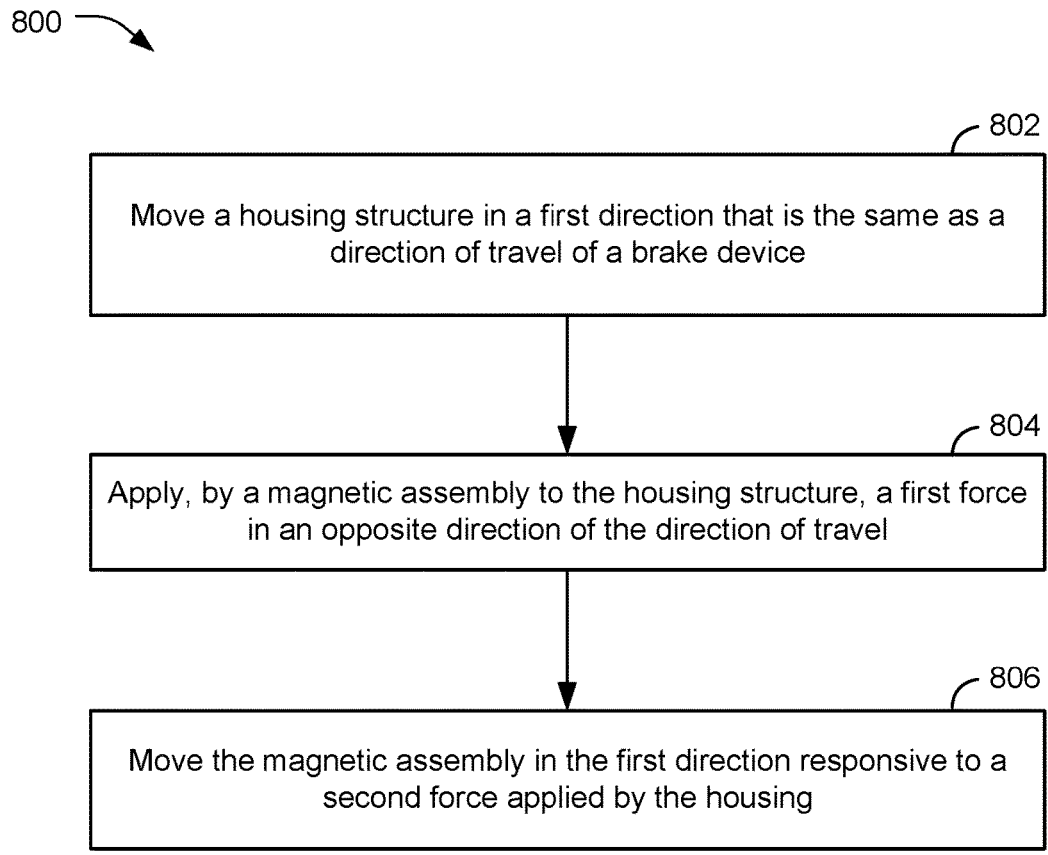
FIG. 8 is a flow chart of an illustrative example of a method of operating a brake module.

FIG. 8 illustrates a flow chart of a particular example of a method 800 of operating a brake device. The brake device (e.g., a brake module) may correspond to the brake module 130 of FIG. 1. In a particular embodiment, the method 800 may be performed at the vehicle 102 or the brake module 130 of FIG. 1, the brake module 300 of FIG. 3, the brake module 400 of FIG. 4, the brake module 500 of FIG. 5, or one or more of the brake modules 610-614 of FIG. 6. The brake module may include a housing structure and a magnetic assembly, such as the housing structure 131 and the magnetic assembly 148 of FIG. 1, respectively.

The method 800 includes moving the housing structure in the first direction that is the same as a direction of travel of the brake device, at 802. The direction of travel may correspond to the direction of travel 103 of FIG. 1.

The method 800 includes applying, by the magnetic assembly to the housing structure, a first force that is applied in an opposite direction of the direction of travel, at 804. The first force may include or correspond to the first force 222 or the third force 252 of FIG. 2. The first force may correspond to a braking force that is applied by the brake device to a vehicle to which the brake device is coupled. For example, the vehicle may include the vehicle 102 of FIG. 1.

The method 800 includes moving the magnetic assembly in the first direction responsive to a second force applied by the housing in the direction of travel, at 806. The second force may include or correspond to the second force 221 or the fourth force 251 of FIG. 2. The second force may greater than the first force. The magnetic assembly may be moved from a first position in which the magnetic assembly is magnetically coupled to a first set of stator poles of an inductor motor to a second position in which the magnetic assembly is magnetically coupled to a second set of stator poles of the inductor motor.

In some implementations, the housing structure may include a bumper. For example, the bumper may correspond to the first bumper 140 of FIG. 1. The housing structure may be moved in the first direction to cause the bumper to contact the magnetic assembly. The first force may be applied to the housing structure and the second force may be applied to the magnetic assembly via the bumper.

In some implementations, after the magnetic assembly is moved in the first direction responsive to the second force, housing structure may be moved in the first direction. Further, the magnetic assembly may apply a third force to the housing structure. For example, the third force may be applied in the opposite direction of the direction of travel. Additionally or alternatively, the housing structure may apply a fourth force to the magnetic assembly. For example, the fourth force may be applied in the direction of travel. If the third force applied by the magnetic assembly to the housing structure is greater than the fourth force applied by the housing structure to the magnetic assembly, movement of the housing structure in the direction of travel is stopped.

By applying the first force (and/or the third force) to the housing structure, a braking force that is opposed to the direction of travel may be applied by the brake device. Thus, the brake device 130 may be used to slow the velocity of the vehicle 102 in the event of a power loss associated with the inductor motor.

Figure 9:
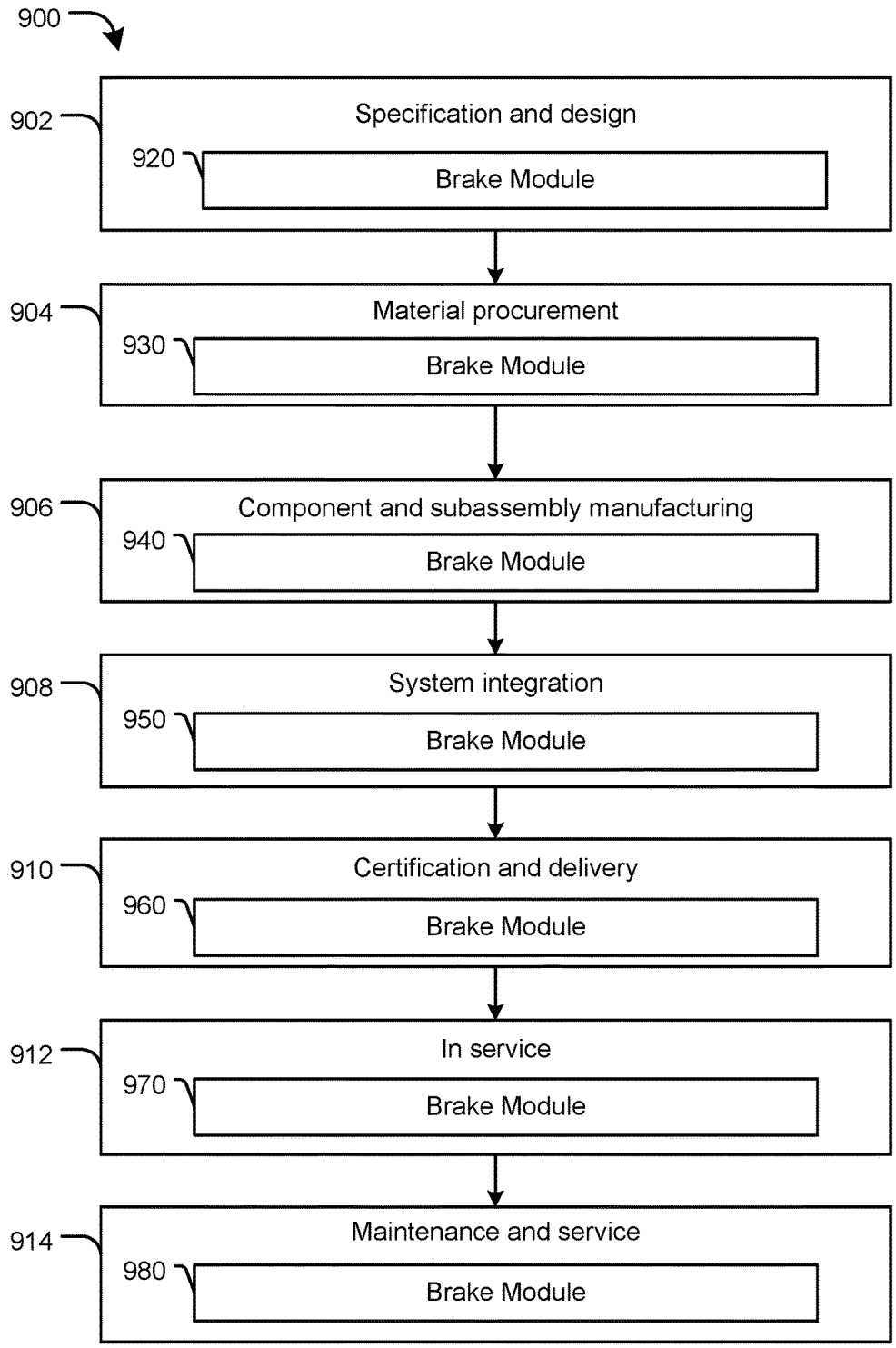
FIG. 9 is a flow chart illustrative of a life cycle of a vehicle that includes a brake module.
Figure 10:
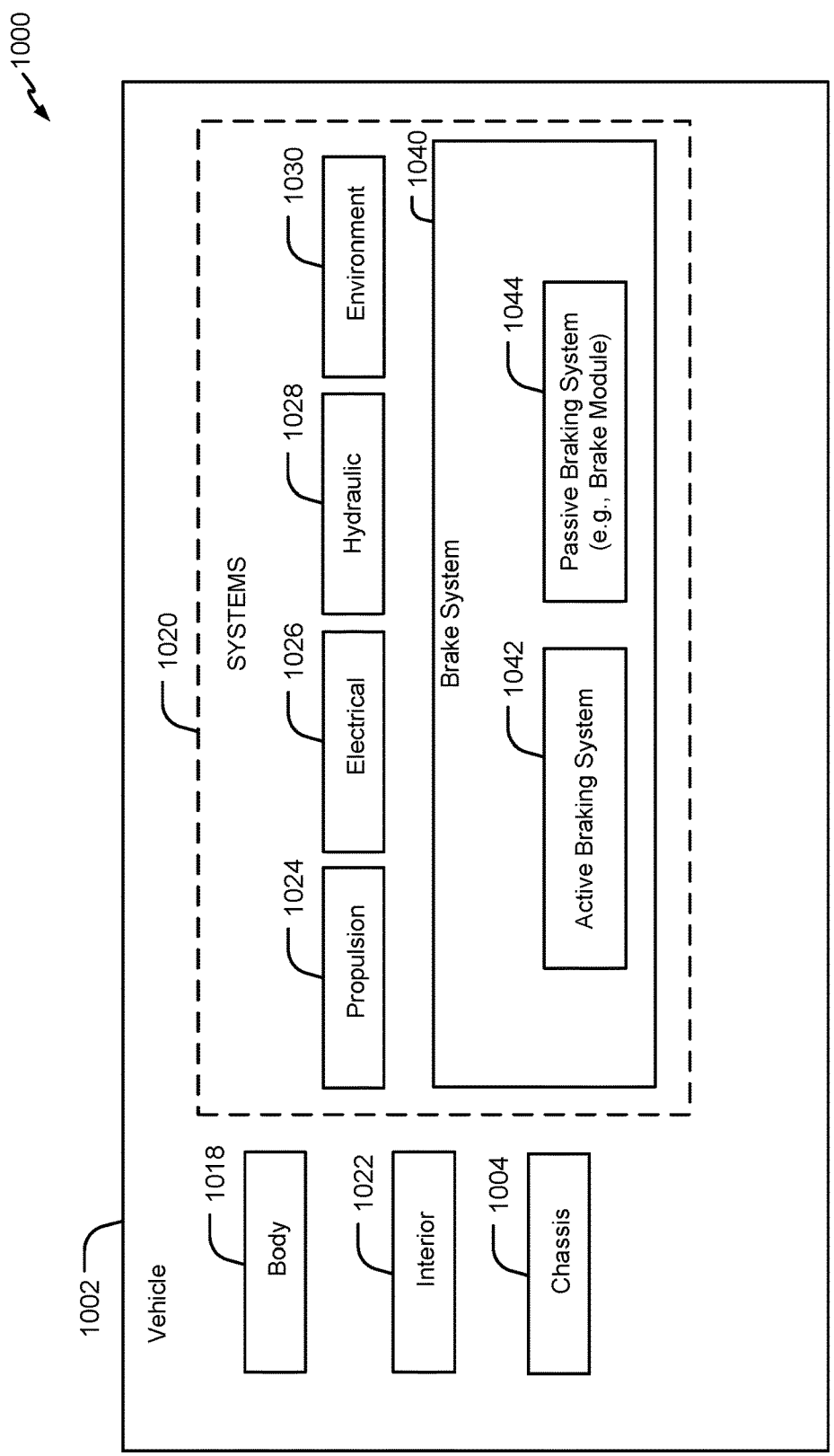
FIG. 10 is a block diagram of an illustrative embodiment of a vehicle that includes a brake module.

Referring to FIGS. 9 and 10, examples of the disclosure are described in the context of a vehicle manufacturing and service method 900 as illustrated by the flow chart of FIG. 9 and a vehicle system 1000 as illustrated by the block diagram of FIG. 10. A vehicle produced by the vehicle manufacturing and service method 900 of FIG. 9 and a vehicle 1002 of FIG. 10 may include a railcar, an aircraft, a watercraft, a land craft, a spacecraft, an autonomous vehicle, or a combination thereof, as illustrative, non-limiting examples.

Referring to FIG. 9, a flowchart illustrative of a life cycle of a vehicle (e.g., a railcar, an automobile, a boat, etc.) that includes a brake module, such as the brake module 130 of FIG. 1, is shown and designated 900. During pre-production, the exemplary method 900 includes, at 902, specification and design of a vehicle, such as the vehicle 1002 described with reference to FIG. 10. During specification and design of the vehicle, the method 900 may include, at 920, specification and design of a brake module. For example, the brake module may include the brake module 130 of FIG. 1, the brake module 300 of FIG. 3, the brake module 400 of FIG. 4, the brake module 500 of FIG. 5, one or more of the brake modules 610-614 of FIG. 6, or a combination thereof. At 904, the method 900 includes material procurement. At 930, the method 900 includes procuring materials for the brake module.

During production, the method 900 includes, at 906, component and subassembly manufacturing and, at 908, system integration of the vehicle. The method 900 may include, at 940, component and subassembly manufacturing (e.g., producing the housing and/or the magnetic assembly) of the brake module and, at 950, system integration (e.g., mounting the brake module to the vehicle or a frame coupled to the vehicle). At 910, the method 900 includes certification and delivery of the vehicle and, at 912, placing the vehicle in service. Certification and delivery may include, at 960, certifying the brake module. At 970, the method 900 includes placing the brake module in service. While in service by a customer, the vehicle may be scheduled for routine maintenance and service (which may also include modification, reconfiguration, refurbishment, and so on). At 914, the method 900 includes performing maintenance and service on the vehicle. At 980, the method 900 includes performing maintenance and service of the brake module. For example, maintenance and service of the brake module may include replacing one or more of the bumper, the magnetic assembly, the housing, one or bolts, the operational plate, and/or one or more sidewalls.

Each of the processes of the method 900 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be a rail company, a transportation company (e.g., an airline), leasing company, military entity, service organization, and so on. Although the method 900 has been described as the brake module being installed prior to delivery of the vehicle, in other implementations, the brake module may be integrated in (e.g., mounted to) a vehicle that is already in service.

Referring to FIG. 10, a block diagram of an illustrative embodiment of a vehicle that includes a brake module is shown and designated 1000. For example, the vehicle 1002 may include or correspond to the vehicle 102 of FIG. 1. To illustrate, the vehicle 1002 may include a railcar, as an illustrative, non-limiting example. As shown in FIG. 10, the vehicle 1002 (e.g., a railcar) produced by the method 900 may include a body 1018 with a plurality of systems 1020, an interior 1022, and a chassis 1004. Examples of high-level systems 1020 include one or more of a propulsion system 1024, an electrical system 1026, a hydraulic system 1028, an environmental system 1030, and a brake system 940. The brake system 1040 may include an active braking system 1042 and a passive braking system 1044. The passive braking system 1044 may be utilized by the vehicle 1002 in the event of a loss of power being supplied to the vehicle (or components and/or systems thereof). The passive braking system 1044 may include or correspond to the brake module 130 of FIG. 1, the brake module 300 of FIG. 3, the brake module 400 of FIG. 4, the brake module 500 of FIG. 5, one or more of the brake modules 610-614 of FIG. 6, or a combination thereof. Any number of other systems may be included. Although a general vehicle is shown, the example described herein may be applied to one or more industries, such as the automotive industry and/or the aerospace, as illustrative, non-limiting examples.

Apparatus and methods embodied herein may be employed during any one or more of the stages of the method 900. For example, components or subassemblies corresponding to production process 908 may be fabricated or manufactured in a manner similar to components or subassemblies produced while the vehicle 1002 is in service, at 912 for example and without limitation. Also, one or more apparatuses, methods embodiments, or a combination thereof, may be utilized during the production stages (e.g., elements 902-910 of the method 900), for example, by substantially expediting assembly of or reducing the cost of the vehicle 1002. Similarly, one or more apparatuses, methods, or a combination thereof, may be utilized while the vehicle 1002 is in service, at 912 for example and without limitation, to maintenance and service, at 914.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific aspects shown. This disclosure is intended to cover any and all subsequent adaptations or variations of various aspects. Combinations of the above aspects, and other aspects not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single example for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. An apparatus comprising:
   a housing structure, wherein the housing structure includes a wall and a bumper coupled to the wall, and wherein the bumper is positioned between the wall and a magnetic assembly; and
   the magnetic assembly, wherein the magnetic assembly is configured to slide within the housing structure in a first direction associated with a direction of travel of the housing structure and in a second direction that is opposite of the first direction, the magnetic assembly comprising:
   a first pole plate having a first polarity; and
   a second pole plate having a second polarity that is opposite of the first polarity.

2. The apparatus of claim 1, wherein the first pole plate is spaced apart from the second pole plate at a predetermined spacing to enable the first pole plate and the second pole plate to align with a set of stator poles of an induction motor that are spaced apart at approximately the same predetermined spacing.

3. The apparatus of claim 2, wherein a distance that the magnetic assembly may slide within the housing structure is at least greater than the predetermined spacing between the first pole plate and the second pole plate, and wherein the housing structure is non-magnetic.

4. The apparatus of claim 1, wherein the magnetic assembly includes a first magnet positioned between the first pole plate and the second pole plate.

5. The apparatus of claim 4, wherein magnetic assembly further comprises:

a third pole plate having the first polarity; and
a second magnet, the second magnet positioned between the second pole plate and the third pole plate.

6. The apparatus of claim 1, wherein the housing structure includes a base having a slot configured to guide movement of the magnetic assembly within the housing structure.

7. The apparatus of claim 1, wherein the magnetic assembly includes:
a first magnet in physical contact with the first pole plate and the second pole plate;
a third pole plate having the first polarity; and
a second magnet, the second magnet in physical contact with the second pole plate and the third pole plate.

8. An apparatus comprising:
a housing structure, wherein the housing structure includes a wall, and wherein the wall includes a plate opening configured to receive a safety plate; and
a magnetic assembly, wherein the magnetic assembly is configured to slide within the housing structure in a first direction associated with a direction of travel of the housing structure and in a second direction that is opposite of the first direction, the magnetic assembly comprising:
a first pole plate having a first polarity; and
a second pole plate having a second polarity that is opposite of the first polarity.

9. The apparatus of claim 8, further comprising the safety plate, wherein the safety plate is configured to slide within the plate opening, wherein the safety plate is positioned at least partially within the housing structure, and wherein the safety plate is configured to isolate one or more magnetic fields associated with the magnetic assembly.

10. The apparatus of claim 9, wherein the safety plate comprises steel, wherein the safety plate is configured to inhibit movement of the magnetic assembly, and wherein the safety plate is configured to magnetically couple to the magnetic assembly.

11. A method comprising:
at a brake device including a housing structure and a magnetic assembly coupled to the housing structure, the magnetic assembly configured to move relative to the housing structure in a first direction and in a second direction within the housing structure, wherein the housing structure includes a wall and a bumper coupled to the wall, wherein the bumper is positioned between the wall and a magnetic assembly, and wherein the magnetic assembly includes a first pole plate having a first polarity and a second pole plate having a second polarity that is opposite of the first polarity, performing:
moving the housing structure in the first direction that is the same as a direction of travel of the brake device;
applying, by the magnetic assembly to the housing structure, a first force that is applied in an opposite direction of the direction of travel; and
moving the magnetic assembly in the first direction responsive to a second force applied by the housing structure in the direction of travel.

12. The method of claim 11, wherein, responsive to the second force, the magnetic assembly is moved from a first position in which the magnetic assembly is magnetically coupled to a first set of stator poles of an inductor motor to a second position in which the magnetic assembly is magnetically coupled to a second set of stator poles of the inductor motor.

13. The method of claim 11, wherein the second force that causes the magnetic assembly to move in the first direction is greater than the first force applied by the magnetic assembly in the opposite direction.

14. The method of claim 11, wherein the first force corresponds to a braking force that is applied by the brake device to a vehicle to which the brake device is coupled.

15. The method of claim 11, further comprising, after the magnetic assembly is moved in the first direction responsive to the second force:
moving the housing structure in the first direction;
applying, by the magnetic assembly to the housing structure, a third force that is in applied in the opposite direction of the direction of travel; and
applying, by the housing structure to the magnetic assembly, a fourth force that is applied in the direction of travel; and
if the third force applied by the magnetic assembly to the housing structure is greater than the fourth force applied by the housing structure to the magnetic assembly, stopping movement of the housing structure in the direction of travel.

16. The method of claim 11, wherein the housing structure includes a bumper, wherein the housing structure is moved in the first direction to cause the bumper to contact the magnetic assembly, and wherein the first force is applied to the housing structure and the second force is applied to the magnetic assembly via the bumper.

17. An apparatus comprising:
a housing structure including a slot;
a magnetic assembly slidably disposed within the slot, the slot configured to guide movement of the magnetic assembly in the housing structure, wherein the magnetic assembly is configured to slide in a first direction associated with a direction of travel of the housing structure and in a second direction that is opposite of the first direction, the magnetic assembly comprising:
a first pole plate having a first polarity; and
a second pole plate having a second polarity that is opposite of the first polarity; and
a bumper coupled to a wall of the housing structure and positioned between the wall and the magnetic assembly.

18. The apparatus of claim 17, wherein the housing structure is configured to be coupled to a vehicle such that the housing structure moves in the first direction that is the same as the direction of travel of the vehicle, and the magnetic assembly is configured to magnetically couple to a first set of stator poles of a primary of an inductor motor, such that the housing structure moves in the direction of travel while the magnetic assembly slidable within the housing structure remains relatively fixed in alignment with the first set of stator poles of the primary of the induction motor, so that the magnetic assembly contacts and applies a first force to the housing structure that is applied in an opposite direction of the direction of travel.

19. The apparatus of claim 17, wherein the housing structure includes a plate opening configured to receive a safety plate.

20. The apparatus of claim 19, further comprising a safety plate, wherein the safety plate is positioned within the safety plate opening at least partially within the housing structure, wherein the safety plate is configured to isolate one or more magnetic fields associated with the magnetic assembly.

* * * * *